United States Patent [19]

Nishikawa et al.

[11] Patent Number: 4,618,037
[45] Date of Patent: Oct. 21, 1986

[54] CONTROL DEVICE FOR DIRECT CLUTCH IN AUTOMATIC TRANSMISSION

[75] Inventors: Masao Nishikawa, Tokyo; Shinzo Sakai, Kamifukuoka; Junichi Miyake, Hidaka, all of Japan

[73] Assignee: Honda Giken Kogyo Kabushiki Kaisha, Tokyo, Japan

[21] Appl. No.: 512,891

[22] Filed: Jul. 11, 1983

[51] Int. Cl.$^4$ .................... F16D 25/14; F16D 33/00
[52] U.S. Cl. ................................ 192/3.3; 192/3.31; 192/0.092; 192/0.076
[58] Field of Search .............. 192/0.033, 0.052, 0.073, 192/0.076, 0.092, 3.3, 3.31, 3.29

[56] References Cited

U.S. PATENT DOCUMENTS

| | | | |
|---|---|---|---|
| 3,857,302 | 12/1974 | Morris | 192/3.3 |
| 4,051,932 | 10/1977 | Arai et al. | 192/3.3 |
| 4,428,259 | 1/1984 | Kubo et al. | 192/3.31 |
| 4,516,671 | 5/1985 | Nishikawa et al. | 192/3.31 X |
| 4,548,307 | 10/1985 | Nishikawa et al. | 192/3.31 X |

FOREIGN PATENT DOCUMENTS

| | | | |
|---|---|---|---|
| 0041238 | 12/1981 | European Pat. Off. | 192/3.3 |
| 55-01099 | 5/1980 | Japan | 192/3.31 |

Primary Examiner—Rodney H. Bonck
Assistant Examiner—Alan G. Towner
Attorney, Agent, or Firm—Armstrong, Nikaido, Marmelstein & Kubovcik

[57] ABSTRACT

Disclosed is a control device for a direct clutch in a vehicular automatic transmission comprising: a fluid torque converter; an auxiliary transmission having plural stages of gear trains selectively connected to the output side of said torque converter, said gear trains having different gear-to-gear speed ratios, and a plurality of hydraulically operated frictional engagement means for actuating the gear trains; and a hydraulically operated direct clutch capable of directly coupling pump and turbine vane wheels of the torque converter together. The control device includes first and second branch passages extended from working fluid passages of one and another of the frictional engagement means, respectively, a first directional control valve interposed between the first branch passage as well as an oil tank and an intermediate passage, and a second directional control valve interposed between the second branch passage as well as the intermediate passage and a working fluid passage of the direct clutch. The control device thus constructed can make more comfortable and stable the vehicle travelling at the time of speed shifting operation and makes it possible to by far reduce fuel cost.

5 Claims, 5 Drawing Figures

CONTROL DEVICE FOR DIRECT CLUTCH IN AUTOMATIC TRANSMISSION

BACKGROUND AND BRIEF SUMMARY OF THE INVENTION

This invention relates to a control device for a direct clutch allowed to operate at proper timing in a vehicular automatic transmission, essentially comprising: a fluid torque converter; an auxiliary transmission having plural stages of gear trains selectively connected to the output of the torque converter, said gear trains each having a different gear-to-gear speed ratio, and a plurality of hydraulically operated frictional engagement means for actuating the plurality of speed change gear trains, respectively; and a hydraulically operated direct clutch capable of directly coupling the pump and turbine vane wheels of the torque converter together.

The direct clutch, when actuated, operates to directly couple the pump vane wheel of the torque converter with its turbine vane wheel, eliminating the slip loss caused between both the vane wheels, thus largely contributing to improvements in smooth running and fuel saving during cruising. Consequently, it is desired to enlarge the range of use of such a direct clutch as much as possible; however, the use of a direct clutch at the speed ratios over two speed stages poses various problems.

The first problem is that, if the speed ratio is selectively switched to another while the direct clutch is in operation, the shock produced when the speed ratio is changed will tend to become greater than what is produced by a conventional clutch; this is inconsistent with the proposition that the direct clutch is designed to offer smooth and comfortable driving.

Accordingly, the first object of the present invention is to provide a control device used to supply a buffer zone where a direct clutch is not allowed to operate in the boundary between at least two speed ratios at which the direct clutch should be employed, in order to prevent a speed change operation from being performed while the direct clutch is in operation.

The second problem refers to a reduction in power efficiency due to the loss of the torque amplifying function of the torque converter, if the direct clutch is actuated. When the operating zone of the direct clutch is provided at the second (2ND) and third (TOP) speed stages for an automatic transmission with three forward speed stages, for instance, the power efficiency is reduced by the difference between the speed ratios immediately after the speed stage has been shifted up to the third one; because the output torque curve of the engine is normally low during its low speed operation, the power efficiency is particularly felt insufficient in a light load operation where the shifting is carried out a little earlier.

The second object of the present invention is therefore to solve the above second problem by setting the buffer zone as having a changeable width, namely, by making the zone wider in a light load operation, whereby the direct clutch is actuated after the speed of revolution of the engine has been recovered to a certain degree.

In addition, reduction in the power efficiency is undesirable when the engine is operating almost in a full throttle state, for example, when the vehicle is about to enter a speedway from a ramp way to join the flow of other running vehicles or when from necessity it has to outstrip another car, which is running ahead, on a speedway. The power efficiency is extremely reduced in particular when the vehicle is travelling with a relatively high speed stage gear train, such as with the TOP gear. Under such special circumstances, it is advisable to release the operation of the direct clutch even at the cost of smoothness and fuel saving.

As a result, the third object of the present invention is to solve the problem of decrease in power efficiency by releasing the operation of the direct clutch whenever a high output is required.

In the case of cruising at a speed near the maximum speed, however, there are same cases where stillness as well as fuel saving may be also required although the transmission of the high output has been achieved. Accordingly, the fourth object of the present invention is to meet the requirement by allowing the direct clutch to continue to operate at a vehicle speed higher than a certain level during travelling with a gear train of the highest speed stage.

In addition, when the engine output is not required on the occasion of adjusting the distance between one vehicle and another ahead by reducing the opening degree of the throttle valve of the engine during cruising or on the occasion of controlling the vehicle speed during travelilng on downhill road, engine braking will be applied more strongly, if the direct clutch is operating. This is not preferable from the standpoint of fuel-saving. In order to prevent engine braking from being applied particularly in a region where the engine runs at a high speed, the direct clutch should be preferably released from its operating condition.

Therefore, the fifth object of the present invention is to prevent increase in fuel consumption by releasing the actuation of the direct clutch in the region where a engine braking is strongly applied, in order to maintain the effect of engine braking at the same level as that resulting from an automatic transmission without a direct clutch.

BRIEF DESCRIPTION OF THE DRAWINGS

The accompanying drawings illustrate an embodiment of the present invention, wherein.

DESCRIPTION OF THE PREFERRED EMBODIMENT

Figure 1:
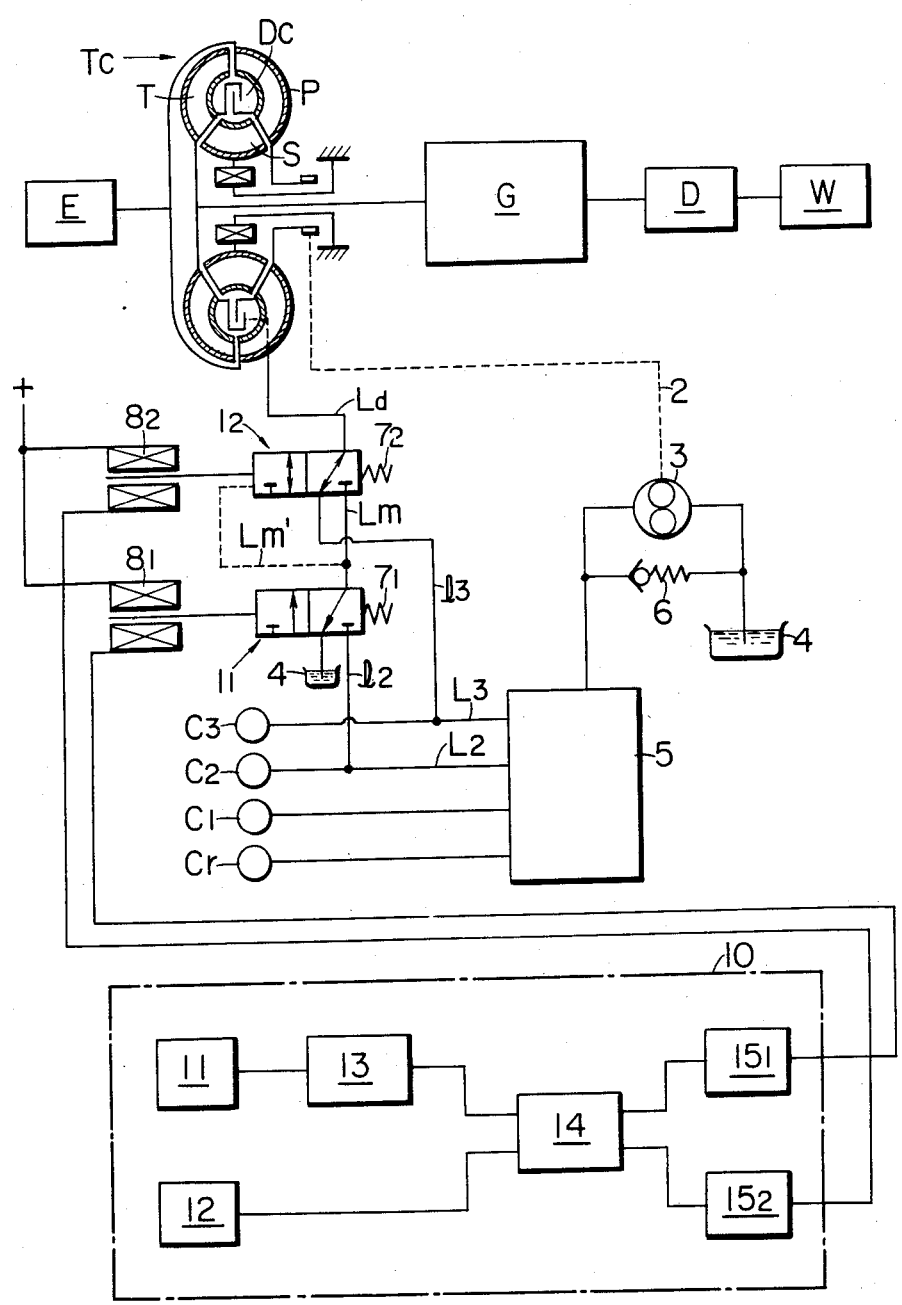
FIG. 1 is a system chart of an automatic transmission equipped with a control device for a direct clutch according to the present invention.

Referring now to the drawings illustrating one embodiment of the present invention, the output of an engine E in FIG. 1 is applied to a pump vane wheel P of a fluid torque converter Tc and then to a turbine vane wheel T fluid-dynamically. When relative velocity exists between both the vane wheels P, T and there is a torque-amplifying action, a stator S bears the reaction force. The output torque of the turbine vane wheel T is transmitted to driving wheels W through an auxiliary transmission G and a differential mechanism D. The auxiliary transmission G is equipped with three forward speed stage gear trains having different gear-to-gear speed ratios, and one backward speed stage gear train (either gear train not shown); and with hydraulic frictional engagement means C1, C2, C3 and Cr such as clutches and brakes for operating these gear trains, respectively.

A direct clutch Dc for mechanically directly coupling the pump vane wheel P and the turbine vane wheel T together is provided between both the wheels P and T, and the direct clutch Dc is, as described later, hydraulically operated through first and second directional control valves $1_1$, $1_2$.

The pump vane wheel P drives a hydraulic pump 3 as a hydraulic source through a gear mechanism and other proper transmission means 2, thereby feeding working fluid in an oil tank 4 to a speed ratio selecting means 5 under pressure. A control valve 6 is provided in an oil passage connecting the discharge side of the hydraulic pump 3 with the oil tank 4 so as to regulate the discharge pressure of the hydraulic pump 3 to a predetermined level.

The speed ratio selecting means 5 detects the vehicle speed as well as the opening degree of the throttle valve representing the output of the engine E and supplies the discharge hydraulic pressure of the hydraulic pump 3 to the frictional engagement means C1, C2, C3 and Cr whenever two of the detected values exceed predetermined reference values. As a result, the frictional engagement means C1, C2, C3 and Cr actuate the corresponding gear trains upon receiving a hydraulic pressure, thereby establishing the speed ratios for the forward first, second, third (TOP) and reverse speeds.

The above-mentioned arrangement is the one already well known and, since it does not constitute a basic portion of the present invention, further detailed description thereof will be omitted.

To introduce the working fluid pressure of the second speed frictional engagement means C2 or the third speed frictional engagement means C3 into the operating piston of the direct clutch Dc, or to release the working fluid pressure into the oil tank 4, there are provided a first branch passage $l_2$ branched from a working fluid passage L2 for connecting the second speed frictional engagement means C2 with the speed ratio selecting means 5 and a second branch passage $l_3$ branched from a working fluid passage L3 for connecting the third speed frictional engagement means C3 with the speed ratio selecting means 5. Further, the first directional control valve $1_1$ is interposed between the first branch passage $l_2$ as well as the oil tank 4 and an intermediate passage Lm, while the second directional control valve $1_2$ is interposed between the intermediate passage Lm as well as the second branch passage $l_3$ and a working fluid passage Ld of the direct clutch Dc.

The first directional control valve $1_1$ is of a solenoid valve type which is switchably operated between a first position (as illustrated) allowing the intermediate passage Lm to be communicated with the oil tank 4 and a second position allowing the intermediate passage Lm to be communicated with the first branch passage $l_2$. The valve $1_1$ is normally held in the first position by the biasing force of a spring $7_1$, when a solenoid $8_1$ is excited, it is switched to the second position by the exciting force of the solenoid.

The second directional control valve $1_2$ is also of a solenoid valve type which is switchably operated between a first position (as illustrated) allowing the working fluid passage Ld of the direct clutch Dc to be communicated with the second branch passage $l_3$ and a second position allowing the working fluid passage Ld to be communicated with the intermediate passage Lm. The valve $1_2$ is normally held in the first position by the biasing force of a spring $7_2$, and when a solenoid $8_2$ is excited, it is switched to the second position by the exciting force of the solenoid. In addition, the end face of the second directional control valve $1_2$ on the side opposite to that subjected to the biasing force of the spring $7_2$ is communicated with the intermediate passage Lm through a pilot passage Lm', and when the end face receives the oil pressure of the intermediate passage Lm, the valve $1_2$ is switched to the second position regardless of deenergization and energization of the solenoid $8_2$.

Accordingly, when the second directional control valve $1_2$ is held in the first position as illustrated, the working fluid passage Ld of the direct clutch Dc is communicated with the working fluid passage L3 for third speed stage through the second branch passage $l_3$ irrespective of the position of the first directional control valve $1_1$, so that only when the working fluid pressure is supplied to the frictional engagement means C3 for third speed stage from the speed ratio selecting means 5, the direct clutch Dc receives the pressure and hence establishes an ON state. Further, when both the directional control valves $1_1$ and $1_2$ are switched to their respective second positions together, the working fluid passage Ld of the direct clutch Dc is communicated with the working fluid passage L2 for second speed stage through the intermediate passage Lm and the first branch passage $l_2$, so that only when the working fluid pressure is supplied to the frictional engagement means C2 for second speed stage from the speed ratio selecting means 5, the direct clutch Dc receives the pressure and hence establishes an ON state. Moreover, when only the second directional control valve $1_2$ is switched to its second position, the working fluid passage Ld of the direct clutch Dc is communicated with the oil tank 4 through the intermediate passage Lm and the first directional control valve $1_1$, so that the direct clutch Dc comes into an OFF state.

With this arrangement, during travelling at the second speed where the frictional engagement means C2 for second speed stage is operating, operation of the direct clutch Dc can be controlled freely by energizing the first directional control valve $1_1$ and will not suffer any influence from energization or deenergization of the second directional control valve $1_2$. Meanwhile, during travelling at the third (TOP) speed where the friction clutch means C3 for third speed stage is operating, no oil pressure is supplied to the working fluid passage L2 for second speed, so that operation of the direct clutch Dc can be controlled freely by energizing the second directional control valve $1_2$ and will not suffer any influence from energization or deenergization of the first directional control valve $1_1$. In other words, both the directional control valves $1_1$ and $1_2$ are able to control operation of the direct clutch Dc in the second and third speed zones, respectively, in an independent manner without giving any influence from one to the other.

A control circuit 10 is connected to the solenoids $8_1$, $8_2$ of the first and second directional control valves $1_1$, $1_2$ for controlling deenergization and energization of these solenoids control circuit 10 consists of a vehicle speed sensor 11, a sensor 12 for sensing the opening degree of the throttle valve, a vehicle speed detection circuit 13, a logic circuit 14, and first and second output amplifier circuits $15_1$, $15_2$.

Next referring to FIG. 2, the control circuit 10 will be described in detail. The vehicle speed sensor 11 comprises a reed switch 21 fixed to a vehicle body at a proper position and a member rotating interlockingly with the wheel, for instance, a magnet rotor 17 fixedly attached to a speed meter cable 16. This rotor 17 is provided with a permanent magnet 17a on its outer periphery. Each time the magnet 17a passes just in front of the reed switch 21 as the speed meter cable 16 turns, the rotor 17 so functions as to turn on the switch 21 and to send an output signal to the vehicle speed detection circuit 13. Consequently, the frequency of the output signal is proportional to the speed of rotation of the speed meter cable 16, that is, a vehicle speed V.

Figure 2:
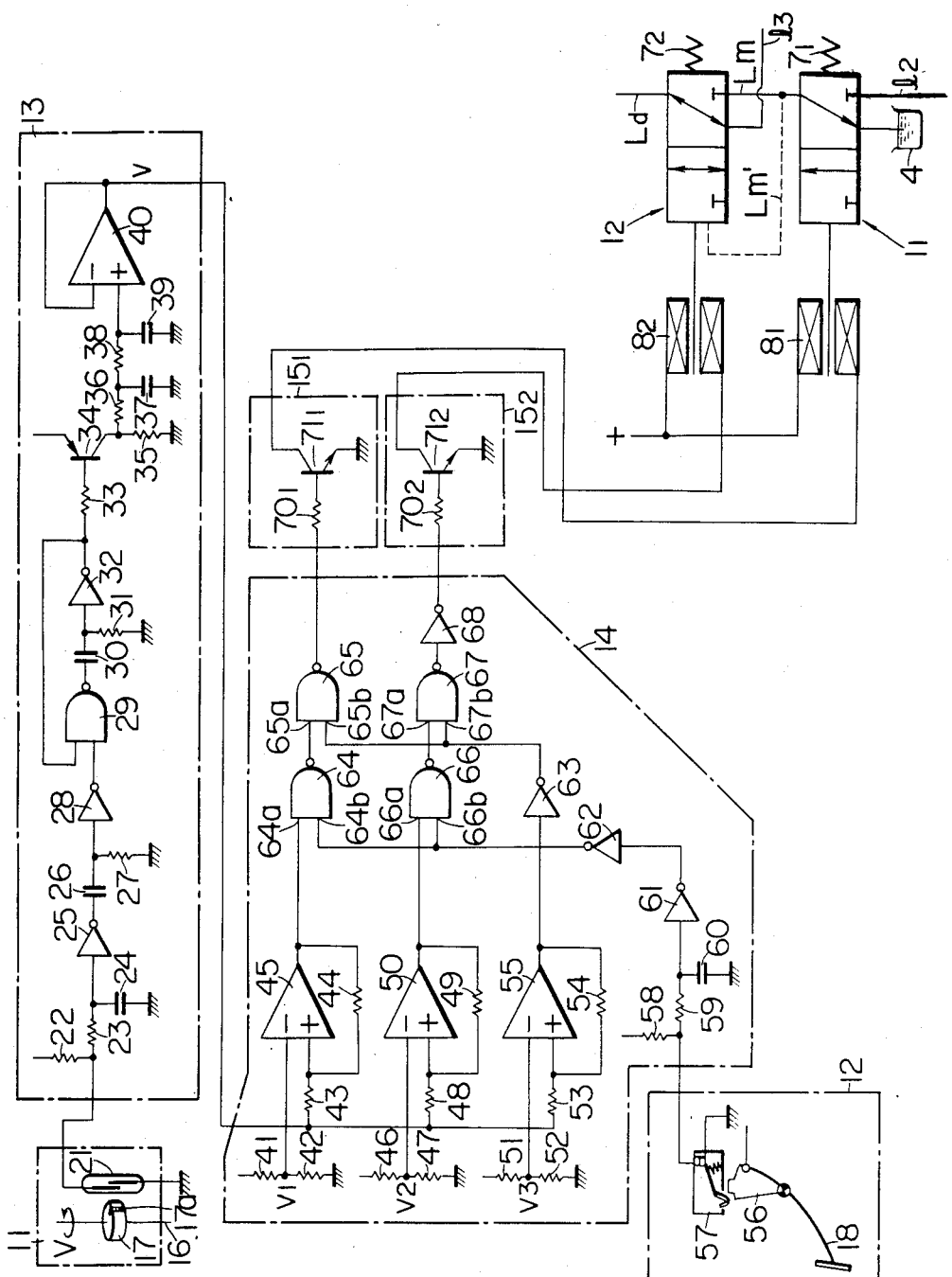
FIG. 2 is a detailed electric circuit diagram of a control circuit shown in FIG. 1.

As shown in FIG. 2, resistors 22, 23, a capacitor 24, an invertor 25, a capacitor 26, a resistor 27, an invertor 28, a NAND circuit 29, a capacitor 30, a resistor 31, an invertor 32, a resistor 33, a transistor 34, resistors 35, 36, 38, capacitors 37, 39 and a comparator 40 are linked together to constitute the vehicle speed detection circuit 13, which generates a pulse having constant width and synchronizing with the signal fed from the vehicle speed sensor 11 and smoothes down the pulse to apply a voltage v proportional to the vehicle speed V to first, second and third comparators 45, 50, 55 of the logic circuit 14.

The sensor 12 for sensing the opening degree of the throttle valve comprises a cam 56 interlocked with an accelerator pedal 18 worked by the foot of and operated by a driver and a normally-closed switch 57 facing the cam. When the accelerator pedal 18 is not heavily trod on, that is, when the opening degree $\theta$ of the throttle valve of the engine is smaller than a predetermined value $\theta 1$, and when the opening degree $\theta$ is larger than a predetermined value $\theta 2$ which is also larger than the value $\theta 1$, the switch 57 is separated from the cam 56 so that the contacts are closed. While the opening degree $\theta$ of the throttle valve is between the predetermined values $\theta 1$ and $\theta 2$, the switch 57 is pressed by the cam 56 so that the contacts are opened. And each time the contacts are opened, an output signal at a high level is sent to an invertor 61 of the logic circuit 14.

The first, second and third comparators 45, 50, 55 of the logic circuit 14 are used to compare the output voltage v of the vehicle speed detection circuit 13 with reference voltages. The reference voltages are set at voltages $v_1$, $v_2$, $v_3$ (however, $v_1 < v_2 < v_3$) corresponding to set vehicle speeds V1, V2, V3 (however, V1 < V2 < V3) by resistors 43, 44; 48, 49; 53, 54, respectively. Accordingly, the outputs of the comparators 45, 50, 55 maintain a high level when the output voltage v of the vehicle speed detection circuit 13 is larger than the reference voltages $v_1$, $v_2$, $v_3$ while maintaining a low level when the former is smaller than the latter.

In the logic circuit 14, the output signal of the first comparator 45 is applied to first input gate 64a of a NAND circuit 64, the output signal of the second comparator 50 is applied to first input gate 66a of a NAND circuit 66, and the output signal of the third comparator 55 is applied to second input gates 65b and 67b of NAND circuits 65 and 67 through an invertor 63. To second input gates 64b, 66b of the NAND circuits 64, 66 the output signal of the invertor 61 is applied through an invertor 62. The output signals of the NAND circuits 64 and 66 are applied to first input gates 65a and 67a of the NAND circuits 65 and 67, respectively. Then, the output signal of the NAND circuit 65 is directly applied to the first output amplifier circuit $15_1$, while the output signal of the NAND circuit 67 is applied to the second output amplifier circuit $15_2$ through an invertor 68.

The first output amplifier circuit $15_1$ comprises a resistor $70_1$ and an NPN type transistor $71_1$ and, when the output of the NAND circuit 65 is at a high level, the transistor $71_1$ is energized to close the solenoid power supply circuit of the first directional control valve 1. Similarly, the second output amplifier circuit $15_2$ comprises a resistor $70_2$ and an NPN type transistor $71_2$ and, when the output of the invertor 68 is at a high level, the transistor $71_2$ is energized to close the power supply circuit of the second directional control valve $1_2$.

Now, if $v < v_1$, all of the outputs of the first, second and third comparators 45, 50, 55 show a low level, so that the output of the NAND circuit 64 receiving the low-level output of the first comparator 45 maintains a high level. This high-level output is applied to the first input gate 65a of the NAND circuit 65, while the low-level output of the third comparator 55 is reversed to a high level through the invertor 63 and then applied to the second input gate 65b of the NAND circuit 65. As a result, the output of the NAND circuit 65 shows a low level, so that the transistor $71_1$ of the first output amplifier circuit $15_1$ is held at cutoff and therefore the first directional control valve $1_1$ is demagnetized. Although the output of the NAND circuit 67 shows a low level likewise, this output is inverted to a high level through the invertor 68 and then applied to the second output amplifier circuit $15_2$, so that the transistor $71_2$ is energized to close the solnoid power supply circuit of the second directional control valve $1_2$.

On the other hand, if $v_1 < v < v_2$, the outputs of the second comparator 50, the NAND circuits 66, 67 and the invertor 68 are the same as those in the case of $v < v_1$, so that the second directional control valve $1_2$ is excited. Meanwhile, the output of the first comparator 45 maintains a high level and this high-level output is applied to the first input gate 64a of the NAND circuit 64, so that the output level of the NAND circuit 64 is determined by the input level of the second input gate 64b thereof.

Accordingly, if $\theta < \theta 1$ or $\theta > \theta 2$ in this case, the output of the switch 57 shows a low level and therefore the input to the second input gate 64b of the NAND circuit 64 also shows a low level, so that the solenoid 8, of the first directional control valve $1_1$ is demagnetized in the same way as in the case of $v < v_1$. However, if $\theta 1 < \theta < \theta 2$ in this case, both the inputs applied to the first and second input gates 64a, 64b of the NAND circuit 64 indicate a high level. Therefore, the output of the NAND circuit 64 assumes a low level and hence the output of the NAND circuit 65 assumes a high level, so that the transistor $71_1$ is energized to close the solenoid power supply circuit of the first directional control valve $1_1$.

Subsequently referring to the case of $v_2 < v < v_3$, because the outputs of the first comparator 45 and the NAND circuits 64, 65 are the same as those in the case of $v_1 < v < v_2$, the solenoid of first directional control valve $1_1$ is demagnetized when $\theta < \theta 1$ or $\theta > \theta 2$ and it is excited when $\theta 1 < \theta < \theta 2$. Meanwhile, although the outputs of the second comparator 50 and the NAND circuits 66, 67 are also the same as those of the first comparator 45 and the NAND circuits 64, 65, the output of the NAND circuit 67 is inverted through the invertor 68, so that the solenoid of second directional control valve $1_2$ is excited when $\theta<\theta 1$ or $\theta>\theta 2$ and it is demagnetized when $\theta 1<\theta<\theta 2$.

Finally, if $v>v_3$, the output of the third comparator 55 indicates a high level which is inverted to a low level through the invertor 63 and then applied to both the second input gates 65b, 67b of the NAND circuits 65, 67, so that the solenoid of, respectively first directional control valve $1_1$ is excited and the second directional control valve $1_2$ is demagnetized.

Figure 3:
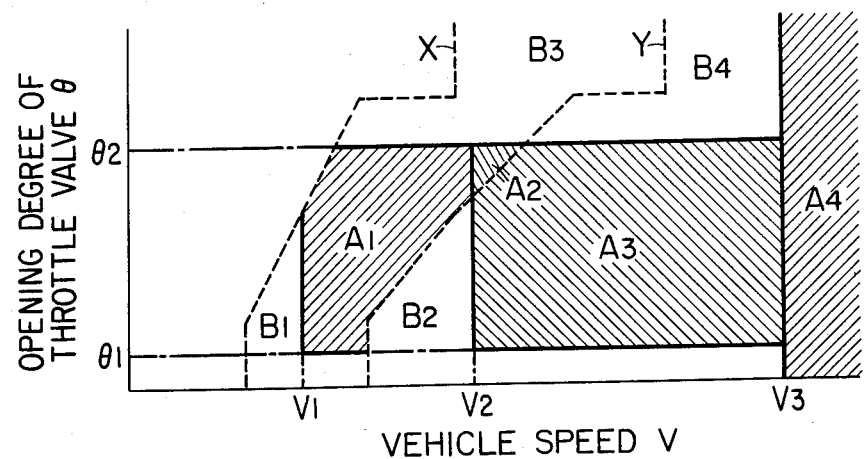
FIG. 3 is a schedule drawing showing the operation of the control device for the direct clutch shown in FIG. 1.
Figure 4:
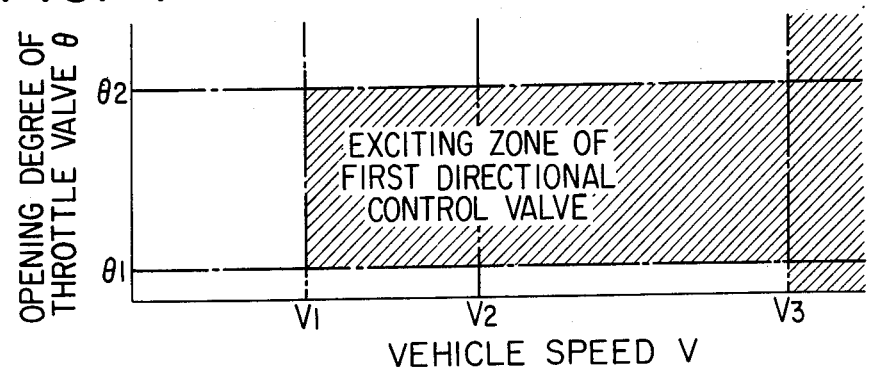
FIGS. 4 and 5 are schedule drawings for excitation of first and second directional control valves shown in FIG. 1.
Figure 5:
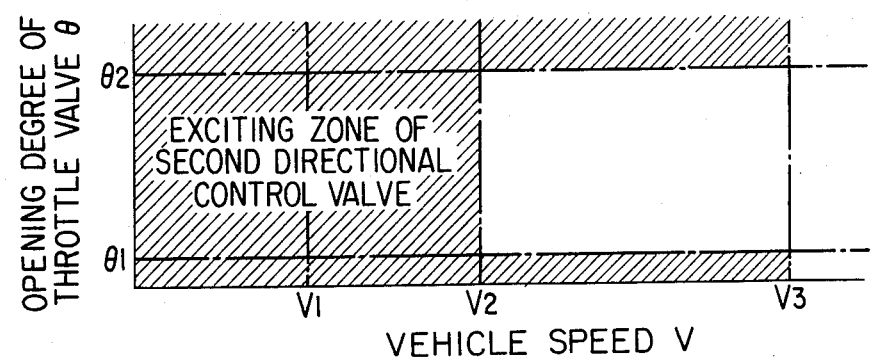

FIGS. 4 and 5 are graphic representations illustrating the states of the first and second directional control valves $1_1$, $1_2$ based on the aforementioned operations. In the figures, exciting and demagnetizing zones are shown by portions filled with oblique lines and others by open portions, respectively. By this, a schedule drawing for use in controlling the direct clutch Dc as shown in FIG. 3 is obtained, wherein the portions with oblique lines are zones where connection of the direct clutch Dc is made, the open portions being those in which its connection is interrupted. The dotted-lines X, Y show characteristic lines of speed shifting. The first speed zone is illustrated to the left of the dotted-line X, the second speed zone between the dotted-lines X and Y, and the third speed zone to the right of the dotted-line Y.

As clearly shown in FIGS. 3 through 5, when $v<v_1$, that is, $V<V1$, only the solenoid of second directional control valve $1_2$ is excited, so that the direct clutch Dc is not connected.

In the case of $v_1<v<v_2$, that is, $V1<V<V2$, because the solenoid of second directional control valve $1_2$ is excited at all times and the solenoid of first directional control valve $1_1$ is excited only when $\theta 1<\theta<\theta 2$, the direct clutch Dc is connected only in the second speed zone, that is, only when the working fluid pressure is supplied to the friction clutch means C2 for second speed; this zone is indicated by A1 in FIG. 3.

If $\theta<\theta 1$ or $\theta>\theta 2$ in the case of $v_2<v<v_3$, that is, $V2<V<V3$, because the solenoid of first directional control valve $1_1$ is demagnetized and the solenoid second directional control valve $1_2$ is excited, the direct clutch Dc is held in a disconnected state. However, if $\theta 1<\theta<\theta 2$, because the solenoid of first directional control valve $1_1$ is excited to cause value $1_1$ be switched over to its second position, the second directional control valve $1_2$ is also switched over to the second position in the second speed zone by virtue of oil pressure produced in the intermediate passage Lm. As a result, the direct clutch Dc receives an oil pressure from the working fluid passage L2 for second speed and hence it comes into an ON state (the zone A2 in FIG. 3). In the third speed (TOP) zone, because the intermediate passage Lm is released from oil pressure and hence the second directional control valve $1_2$ is returned back to the first position, the direct clutch Dc receives an oil pressure from the working fluid passage L3 for third speed and comes into an ON state (the zone A3 in FIG. 3).

In this way, during travelling at the second or TOP speed, the direct clutch Dc can be actuated as required and thus largely contributes to improvement in smoothnes and reduction of fuel consumption.

The zones B1 and B2 in FIG. 3 are buffer zones in which the direct clutch Dc has been disengaged, and the torque converter Tc in these zones can be used to absorb a shock caused by shifting the speed up or down between the first and second speed stages and between the second and third speed stages.

In addition, when the vehicle is made to travel in a general urban district, the smaller the opening degree of the throttle valve i.e., when (the output of the engine is weaker), the earlier shifting up of the speed is carried out. This will result in decreased power efficiency and the decreased efficiency must be supplemented by the torque amplifying function of the torque converter Tc. However, since the zones B1 and B2 are expanded toward the smaller side of the opening degree $\theta$, the direct clutch Dc can be maintained in a disengaged state until the vehicle speed increases to reach V1 or V2 even after the speed has been shifted up to the second or third speed stage, thus making it possible to meet the requirements.

Further, even with the vehicle being travelled at the second or third speed stage while keeping the direct clutch Dc in operation, if the accelerator pedal is depressed under the necessity of quick acceleration, the direct clutch Dc is disengaged upon that operation when the opening degree $\theta$ of the throttle valve exceeds $\theta 2$ (the regions B3 and B4 in FIG. 3). Therefore, the primary torque amplifying function of the torque converter Tc is fully provided, thus permitting good accelerating driving. On the other hand, if the opening degree $\theta$ is decreased to less than $\theta 1$ to reduce the speed during cruising, the direct clutch Dc is disengaged to generate a slip in the torque converter Tc. Consequently, the effect of engine braking is reduced and for this reason the fuel consumption can be prevented from increasing by suppressing any excessive increase in the speed of revolution of the engine.

When $v>v_3$, the solenoid of second directional control valve $1_2$ is demagnetized irrespective of $\theta$ and the connection of the direct clutch Dc, which is always connected in the third speed zone, is maintained at all times. A4 in FIG. 3 shows this zone wherein the direct clutch Dc is left in a connected state and this makes it possible for a vehicle to perform a quiet and economical cruising at a high speed even if the vehicle is made to travel on a superhighway with the throttle valve being fully opened.

In the aforementioned embodiment, the direct clutch Dc can be so constructed that, when it is in operation, torque is transmitted in both directions between the pump and turbine vane wheels P, T of the torque converter Tc, or torque is transmitted unidirectionally from the pump vane wheel P to the turbine vane wheel T. However, in the latter case, when a one-way clutch function is adopted, there remains almost no positive reason for releasing the actuation of the direct clutch Dc when $\theta<\theta 1$. In addition, it is effective for the directional control valves $1_1$ and $1_2$ to be formed of solenoid valves for achieving a reduced size and higher accuracy of the device, but these valves may be formed of a hydraulically actuated type which is actuated by throttle hydraulic pressure and governor hydraulic pressure as is generally used to control a speed change valve of the auxiliary transmission G. As for the automatic transmission, it need not always be a full-automatic transmission but may be a so-called semi-automatic transmission in which the speed ratio is manually selected. In addition, the frictional engagement means Cr, C1, C2 and C3, which generally operate to establish a speed ratio when a working fluid pressure is supplied thereto can however be of a type which is normally released by virtue of working fluid pressure and is actuated to establish the speed change ratio by means of a spring when the working fluid pressure is removed.

Further, the number of speed stages of the automatic transmission is not limited to the three forward stages as mentioned above by way of an example. It is apparent that the present invention is applicable to automatic transmissions with four or more forward stages, in which case two directional control valves can be provided for the speed ratios in the highest speed stage and in the one immediately lower than the former. The present invention can also be easily applied to the speed ratios in any three stages adjacent to each other by inserting another directional control valve corresponding to the second directional valve $l_2$ between the second directional control valve $l_2$ and the direct clutch Dc. Stated differently, one directional control valve may be provided additionally, in each case when the applied speed ratios are increased in number by one stage.

A Hall element or IC in place of the reed switch 21 may be used in the vehicle speed sensor 11. Otherwise, it may be composed of a combination of a photointerrupter and a screen plate which is provided on the speed meter cable. The sensor 12 for sensing the opening degree of the throttle valve may, like the vehicle speed sensor 11, be constructed of a combination of a photointerrupter and a screen plate, or of a magnetic means which comprises a reed switch and a magnet. Although the vehicle speed has been regulated with an analog process in the control circuit 10, it may be digitally processed and the arrangement using the logic elements may be replaced with a programmable one using a microcomputer.

According to the present invention, has been described above, the first and second branch passages are extended from the working fluid passages of one and another frictional engagement means, respectively, the first directional control valve is interposed between the first branch passage as well as the oil tank and the intermediate passage to allow the intermediate passage to be selectively communicated with the first branch passage and the oil tank, and the second directional control valve is interposed between the second branch passage as well as the intermediate passage and the working fluid passage of the direct clutch to allow the working fluid passage to be selectively communicated with the second branch passage and the intermediate passage. With this arrangement, the direct clutch may be automatically actuated in a travelling condition with predetermined speed ratios by controlling the first and second directional control valves in a proper method, thereby ensuring a lowered fuel consumption and quiet travelling. Further, a buffer zone where the direct clutch is not allowed to operate can be formed in the boundary between two speed ratios, depending on speed shifting characteristics so that any shock at the time of speed shifting is prevented. In addition, the buffer zone is made wider on the low load side, so that the direct clutch will not be actuated unless the speed of revolution of the engine is recovered to a certain degree even if shifting the speed up is carried out earlier in a light load operation. Consequently, a sufficient torque amplifying function of the torque converter is available, and the power efficiency is not felt insufficient. Morover, when a high output is required during travelling at a relatively high speed ratio, it is possible to obtain the torque amplifying function of the torque converter by releasing the actuation of the direct clutch. During travelling in the TOP stage, by keeping the direct clutch in operation when entering the predetermined high speed condition, the requirements for smoothness and fuel saving are satisfied, so that comfortable high speed cruising conditions are made available. In addition, when engine braking is applied during high speed travelling, it is possible to bring about such an effect as of preventing the fuel-saving deterioration by releasing the operation of the direct clutch.

According to the second aspect of the present invention, because the intermediate passage is connected with the second directional control valve such that the hydraulic pressure produced in the intermediate passage allows the second directional control valve to be switched over to the position where the working fluid passage of the direct clutch is communicated with the intermediate passage, it is ensured that the second directional valve is switched over to assume different positions depending on the presence or absence of the hydraulic pressure in the first branch passage, even if the first directional control valve has been switched to the position where the intermediate passage is communicated with the first branch passage. With this arrangement, the direct clutch can be controlled on various demands while contributing to simplify the input signals to be applied to the second directional control valve.

What is claimed is:

1. In a vehicle having a vehicular automatic transmission including a fluid torque converter having a pump vane wheel and a turbine vane wheel, a source of working fluid pressure, a working fluid tank, an auxiliary transmission having plural stages of gear trains each having a different gear-to-gear speed ratio and being selectively connectable with an output side of said torque converter, a plurality of hydraulically-operated frictional engagement means each being selectively operable by application thereto of working fluid pressure supplied via corresponding one of a plurality of speed ratio-selecting working fluid passages for actuating a corresponding one of said plural stages of gear trains of said auxiliary transmission, and a hydraulically-operated direct clutch for selectively mechanically coupling together said pump vane wheel and said turbine vane wheel of said torque converter upon application to said direct clutch of working fluid pressure connected to said direct clutch;

a direct clutch control device for controlling engagement of said direct clutch and having a control valve mechanism connected for controlling the supplying of working fluid pressure via said direct clutch working fluid passage to said direct clutch, comprising:

a plurality of branch working fluid passages each connected at one end thereof so as to be in fluid communication with a mediate portion of a corresponding one of said speed ratio-selecting working fluid passages; and switchable directional control valve means interposed between said plurality of branch working fluid passages and said direct clutch working fluid passages for permitting selective fluid communication between said direct clutch working fluid passages and respective ones of said plurality of branch working fluid passages, said switchable directional control valve means being switchable to respective positions for selectively fluidly communiating said direct clutch working fluid passages with respective ones of said plurality of branch working fluid passages for supplying working fluid pressure from said respective ones of said branch working fluid passages to said direct clutch so as to engage said direct clutch, or with said working fluid tank for discharging working fluid from said direct clutch to said working fluid tank so as to disengage said direct clutch, said switchable directional control valve means comprising a plurality of directional control valves interconnected by intermediate working fluid passage means, at least one of said plurality of directional control valves being so adapted that upon application thereto of working fluid pressure via said intermediate passage means, said at least one directional control valve will operate to supply said applied working fluid pressure via said direct clutch working fluid passage to said direct clutch.

2. A direct clutch control device in accordance with claim 1, wherein said intermediate passage means are connected with said at least one of said plurality of directional control valves in such manner that application of working fluid pressure via said intermediate passage means to said at least one directional control valve causes said at least one directinal control valve to assume a position in which said applied working fluid pressure is thereby supplied to said direct clutch working fluid passage.

3. A direct clutch control device in accordance with claim 1, or 2 wherein operation of said control valve mechanism is controlled in accordance with the degree of opening of a throttle of an engine of said vehicle such that said switchable directional control valve means operate to fluidly communicate said direct clutch working fluid passage with said working fluid tank for discharging working fluid from said direct clutch to said working fluid tank to disengage said direct clutch whenever said throttle opening degree is below a first predetermined value or above a second predetermined value greater than said first predetermined value.

4. A direct clutch control device in accordance with claim 3, wherein operation of said control valve mechanism is further controlled in accordance with the speed of said vehicle such that said switchable directional control valve means operate to fluidly communicate said direct clutch working fluid passage with a respective one of said plurality of branch working fluid passages for engaging said direct clutch whenever said vehicle speed exceeds a predetermined value, irrespective of the degree of opening of said throttle.

5. A direct clutch control device in accordance with claim 1, wherein said plurality of branch working fluid passages comprises:
a first branch passage branching off from and in fluid communication with a first speed ratio-selecting working fluid passage associated with a first gear train of said auxiliary transmission; and
a second branch passage branching off from and in fluid communication with a second speed ratio-selecting working fluid passage associated with a second gear train of said auxiliary transmission, said second gear train having a gear-to-gear speed ratio adjacent to and providing a higher transmission speed than the gear-to-gear speed ratio of said first gear train;
and wherein said plurality of directional control valves comprises:
a first directional control valve disposed for selectively fluidly communicating one end of said intermediate working fluid passage means with said first branch passage or said working fluid tank; and
a second directional control valve disposed for selectively fluidly communicating said direct clutch working fluid passage with said second branch passage or another end of said intermediate working fluid passage means, said second directional control valve being so adapted that upon application thereto of working fluid pressure via said intermediate working fluid passage means and said first directional control valve from said first branch passage, said second directional control valve will operate to fluidly communicate said intermediate working fluid passage means with said direct clutch working fluid passage for supplying said applied working fluid pressure to said direct clutch to cause engagement thereof.

* * * * *